No. 717,100. Patented Dec. 30, 1902.
C. H. KRAUSS.
TONGUE SWITCH.
(Application filed Apr. 16, 1902.)
(No Model.)

WITNESSES:
A. V. A. B. McCauley.
L. O'Connell

INVENTOR
Chas. H. Krauss,
BY Geo. H. Parmelee,
his ATTORNEY.

UNITED STATES PATENT OFFICE.

CHARLES H. KRAUSS, OF JOHNSTOWN, PENNSYLVANIA, ASSIGNOR TO THE LORAIN STEEL COMPANY, A CORPORATION OF PENNSYLVANIA.

TONGUE-SWITCH.

SPECIFICATION forming part of Letters Patent No. 717,100, dated December 30, 1902.

Application filed April 16, 1902. Serial No. 103,178. (No model.)

*To all whom it may concern:*

Be it known that I, CHARLES H. KRAUSS, of Johnstown, in the county of Cambria and State of Pennsylvania, have invented a new and useful Improvement in Tongue-Switches, of which the following is a full, clear, and exact description, reference being had to the accompanying drawings, which form a part of this specification.

My invention has relation to certain new and useful improvements in tongue-switches, and is designed to provide means of simple and efficient character for holding to its seat the movable tongue or point.

With this object in view my invention consists in the novel construction, combination, and arrangement of parts, all as hereinafter described, and pointed out in the appended claims, reference being had to the accompanying drawings, in which—

Figure 1:
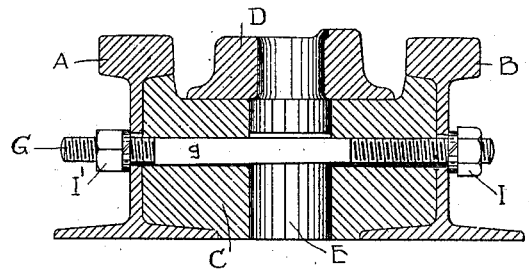
Figure 2:
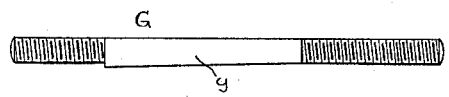
Figure 3:
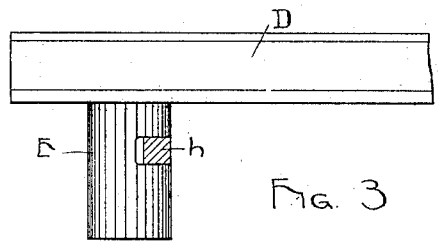

Figure 1 is a cross-section of a tongue-switch embodying my invention; Fig. 2, a detail view of the fastening-pin, and Fig. 3 a side view of the switch-tongue with the fastening-pin shown in cross-section.

In the drawings the letter A designates the main-track rail, and B the branch-track rail.

C is the central body or filler, which forms the bed for the movable switch-tongue D. The latter is formed with the usual depending pin or pivot E at its heel end, provided with a bearing-seat in the bed C. In practice the continual hammering or pounding action which the tongue or point receives soon causes considerable wear and looseness in the pin-bearing, and to permit this to be taken up and to hold the tongue down to its seat I provide the fastening-pin G. This pin is inserted through the webs of the rails A and B and through the bed or filler C and also engages a groove $h$, cut in the tongue pin or pivot E. The central portion of the pin is tapered on its under side, as shown at $g$.

It will be readily seen that when the pin is driven to its seat the tapered side $g$ will take a bearing on the lower wall of the recess $h$, and will thereby act to draw the tongue down closely to its seat. It must not, however, be driven so tightly as to interfere with the limited rotary movement of the tongue pin or pivot. The said pin G is secured in place by a nut I, and I prefer also to use a nut I' on the opposite end, which may be operated (by first slacking the nut I) to draw the pin back somewhat should it be seated too tightly. This nut I' may, however, be omitted. The nut I provides means for readily tightening the pin G at any time to take up wear.

The rails are punched or drilled to receive the pivot G, and the bed or filler C is formed with a core (or it may be drilled) to seat said piece.

I do not wish to limit myself to the exact construction which I have herein shown and described, as various changes may be made in the details without departing from the spirit and scope of my invention.

Having thus described my invention, what I claim as new, and desire to secure by Letters Patent, is—

1. In a tongue-switch, the combination with a pivoted switch-tongue and its bed or supporting structure, of a fastening-pin extending transversely through the bed or structure and having a holding-down engagement with the switch-tongue the extent of which may be varied by endwise movement of said pin, and positive means for securing the pin in different endwise adjustments.

2. In a tongue-switch, the combination with a pivoted switch-tongue, and its bed or supporting structure, of a fastening-pin extending transversely through the bed or structure, and formed with a tapered or wedge portion which engages the pin or pivot of the switch-tongue, and with threaded end portion or portions to seat a securing nut or nuts.

3. In a tongue-switch, the combination with a pivoted switch-tongue and its bed or supporting structure, of a fastening-pin extending transversely through the said bed or structure and having a holding-down engagement with the pin or pivot of the switch-tongue, and nuts engaging the threaded end portions of the said pin.

4. The combination with a switch-tongue having a depending pivot-pin formed with a groove or recess, of a fastening-pin seated in the supporting structure and formed with a tapered portion which engages the said recess, and means for adjustably securing the said pin.

In testimony whereof I have affixed my signature in presence of two witnesses.

CHARLES H. KRAUSS.

Witnesses:
GEORGE H. PARMELEE,
H. W. SMITH.